Aug. 2, 1960

R. W. HEER ET AL 2,947,230

BITUMINOUS PAVER

Filed Feb. 21, 1957

INVENTORS
RALPH W. HEER
L. W. MUNDY
BY
ATTORNEY

Aug. 2, 1960

R. W. HEER ET AL 2,947,230

BITUMINOUS PAVER

Filed Feb. 21, 1957

INVENTORS
RALPH W. HEER
L. W. MUNDY

BY

ATTORNEY

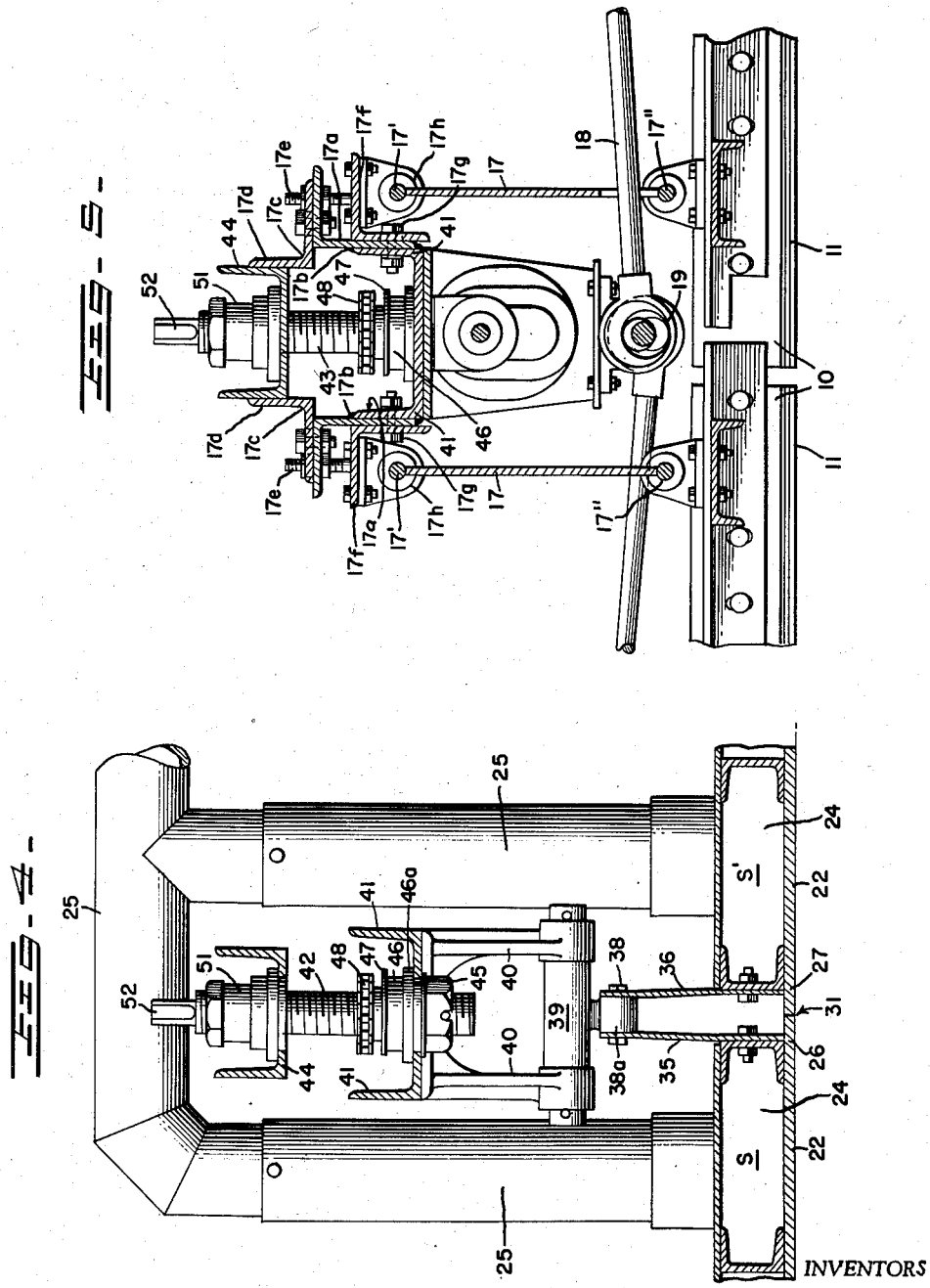

Aug. 2, 1960 R. W. HEER ET AL 2,947,230
BITUMINOUS PAVER
Filed Feb. 21, 1957 7 Sheets-Sheet 5
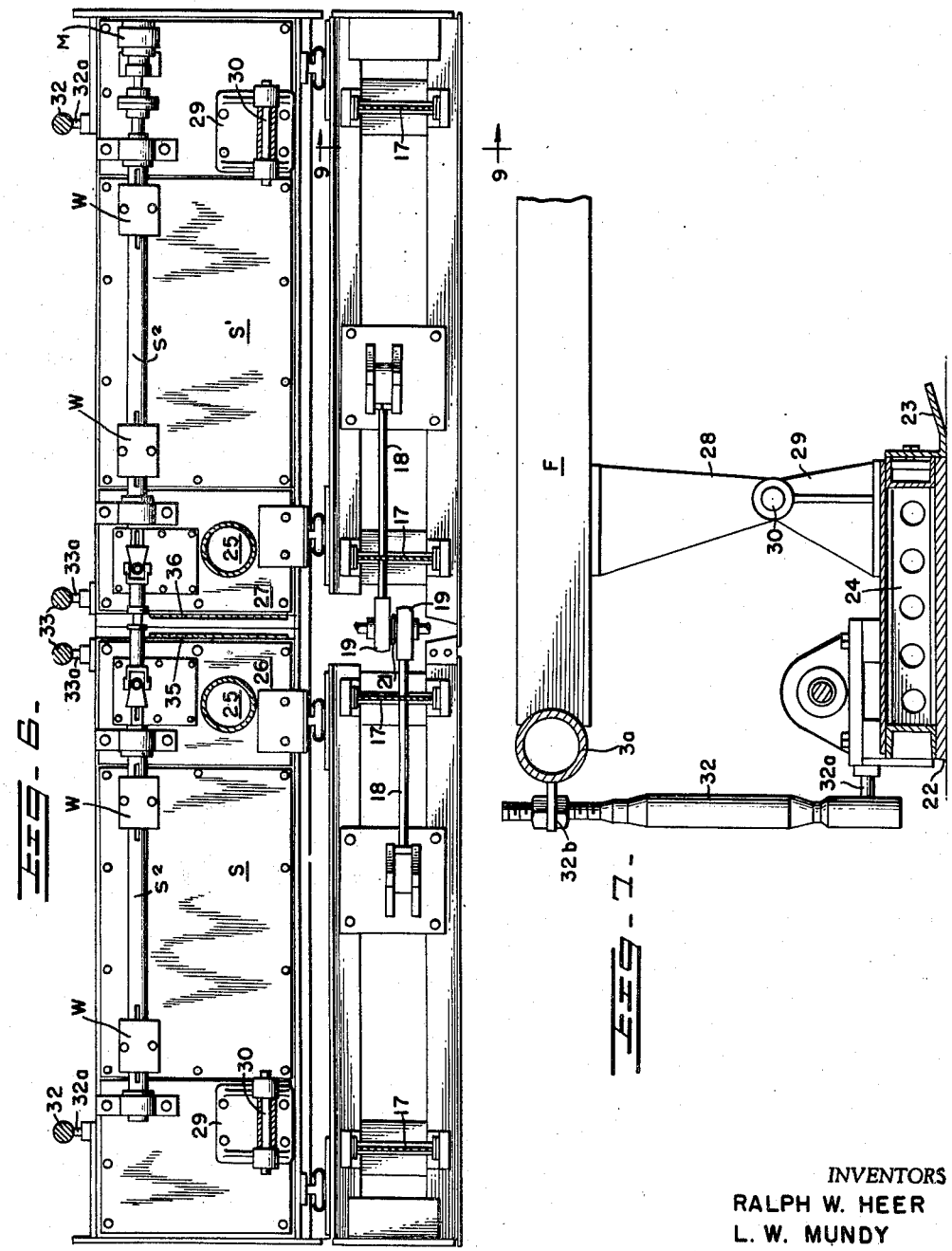
INVENTORS
RALPH W. HEER
L. W. MUNDY
BY 
ATTORNEY

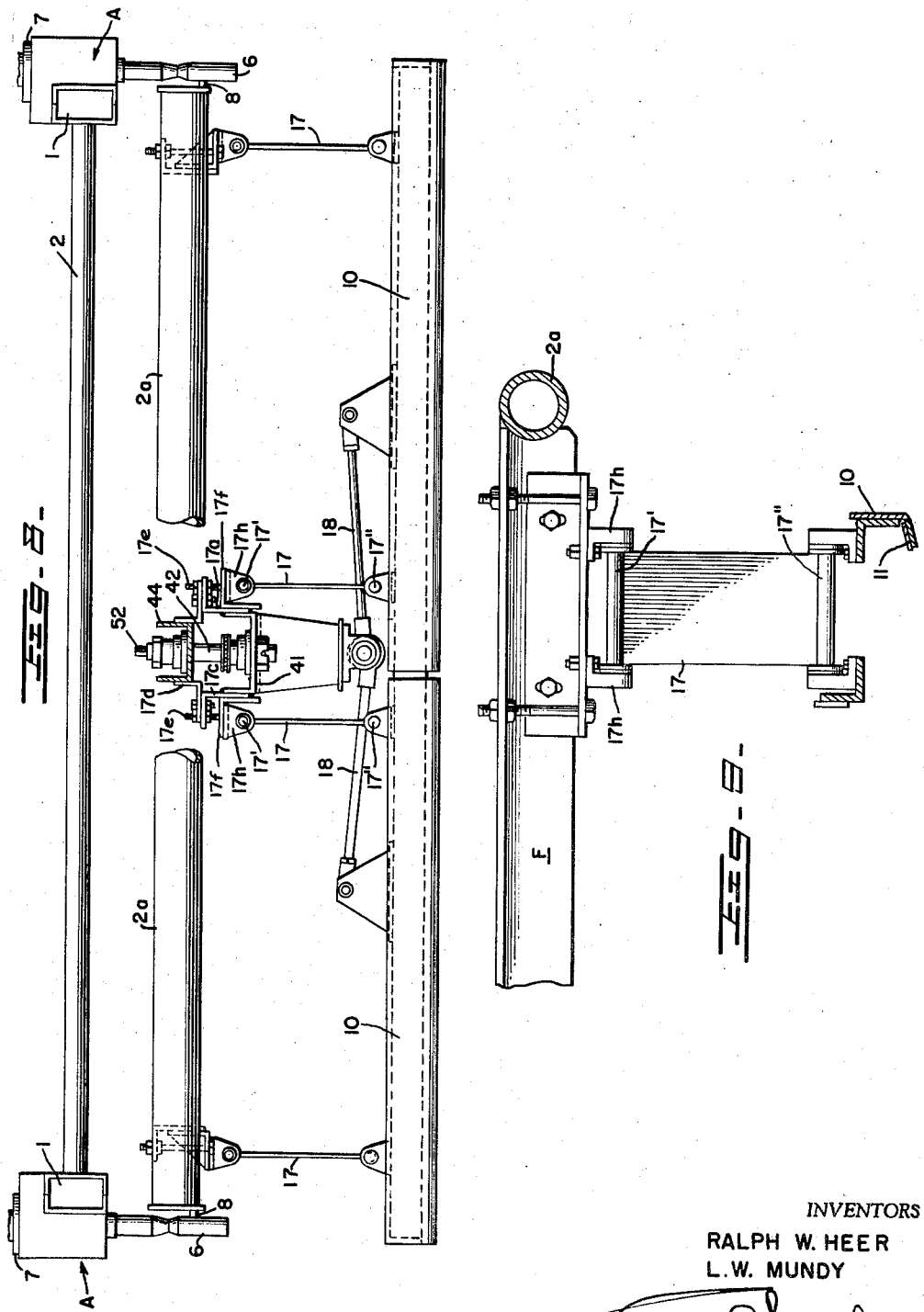

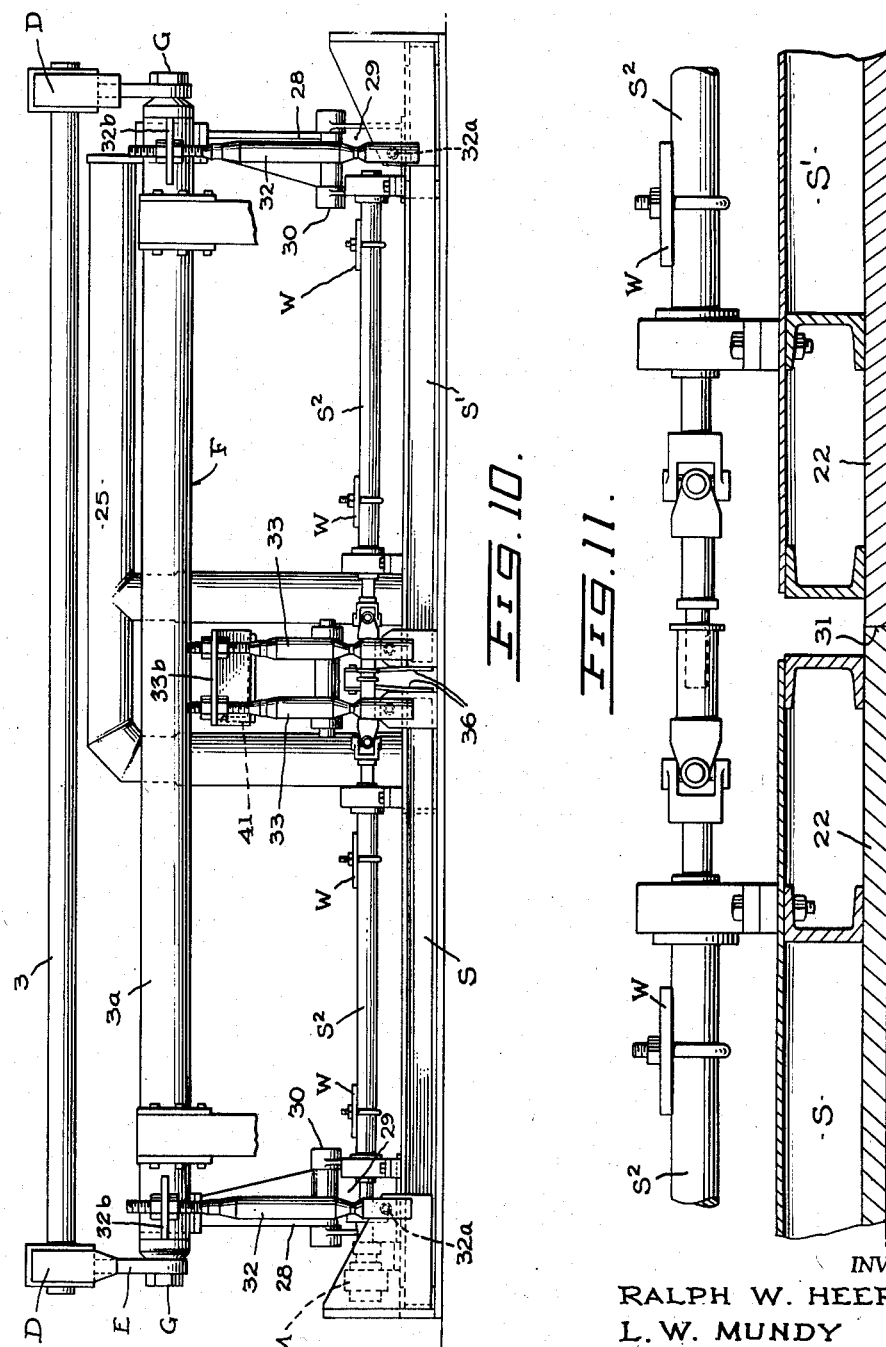

United States Patent Office 2,947,230
Patented Aug. 2, 1960

2,947,230

BITUMINOUS PAVER

Ralph W. Heer and Lloyd W. Mundy, Minneapolis, Minn., assignors to Poor & Company, Chicago, Ill., a corporation of Delaware Filed Feb. 21, 1957, Ser. No. 641,533

3 Claims. (Cl. 94—46)

This invention relates to bituminous road paving apparatus.

One of the objects of the invention is to provide novel and effective crowning means for operating the sections of the main or vibrating screed in a simple and effective manner to raise the inner ends thereof relative to the outer ends to effect the desired crown of the pavement.

Another object of the invention is to provide novel mold board means for insuring a more effective distribution of the road-mix before it passes to the oscillating screed sections, and also to enable the operator to more easily and readily clear accumulated residual portions of the mix from in front of said oscillating sections after the pavement has been laid, as for example, after a completed run or at the end of a day.

With the above and other objects in view which will more readily appear as the nature of the invention is better understood, the same consists in the novel construction and arrangement of parts hereinafter more fully described and claimed in the accompanying drawings, in which:

Figure 3:
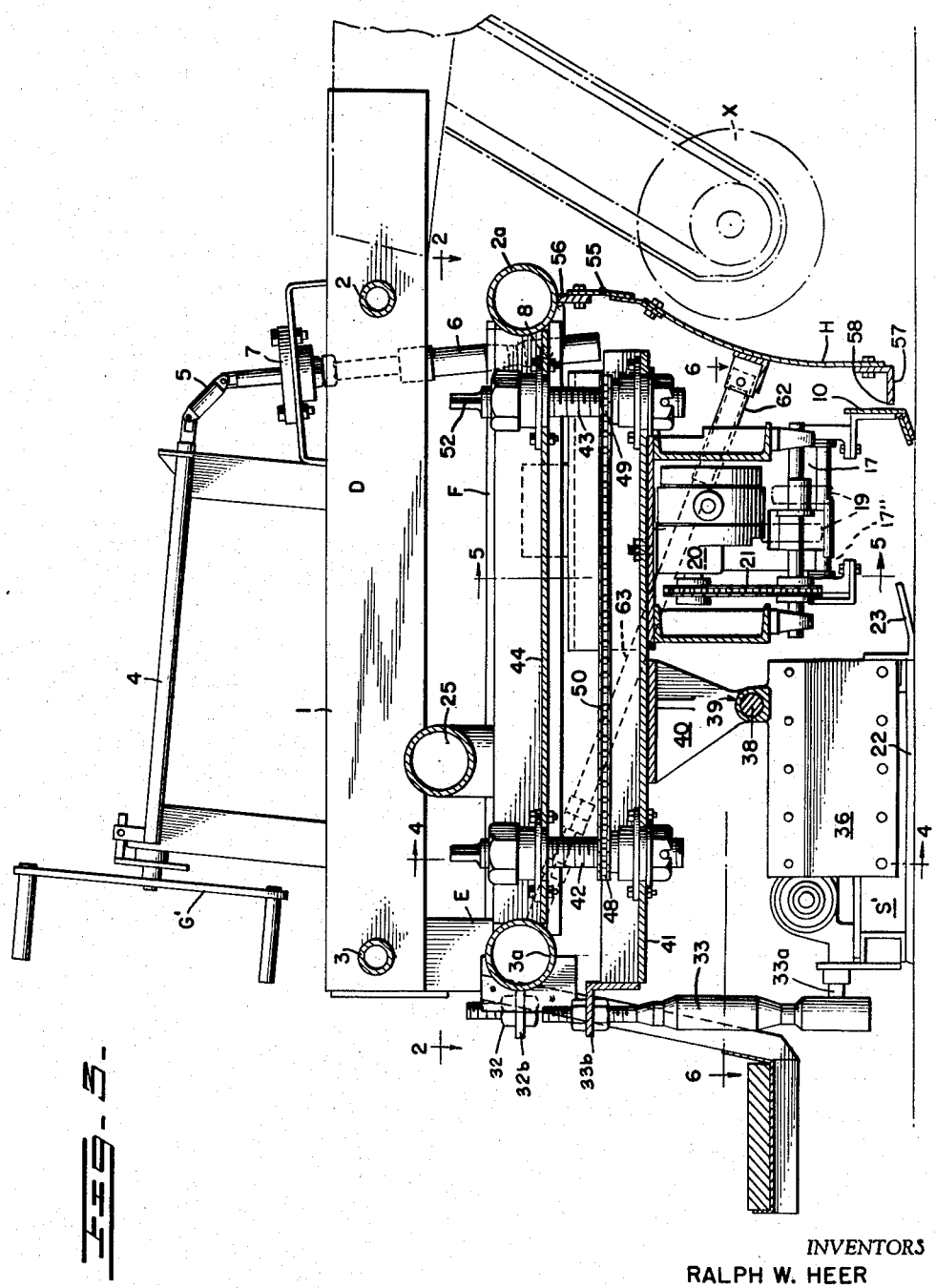
Fig. 3 is a vertical cross sectional view taken on the line 3—3 of Fig. 2.

Figs. 4 and 5 are respectively vertical cross sectional views taken on the lines 4—4 and 5—5 of Fig. 3.

Fig. 6 is a horizontal sectional view taken on the line 6—6 of Fig. 3.

Figure 2:
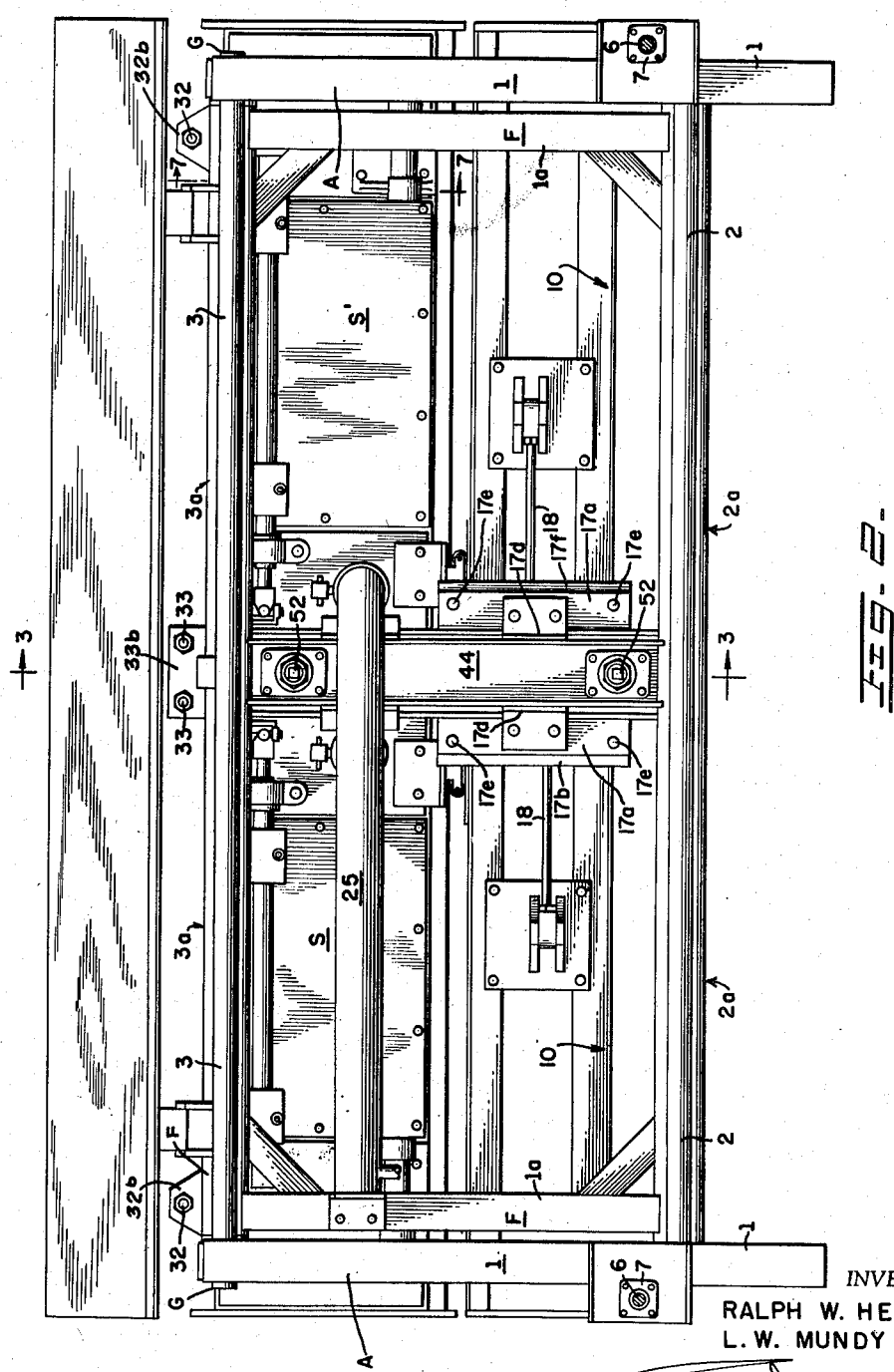
Fig. 2 is a top plan view of the sub-frame which carries the screed and is taken on the line 2—2 of Fig. 3.

Fig. 7 is a vertical sectional view taken on the line 7—7 of Fig. 2.

Fig. 8 is a partial elevation of the oscillating screeds and their relation to the crowning mechanism.

Fig. 9 is a detail sectional view taken on the line 9—9 of Fig. 6 illustrating the hangers suspended from the sub-frame for supporting the oscillating screeds.

Similar reference characters designate corresponding parts throughout the several views.

Figure 1:
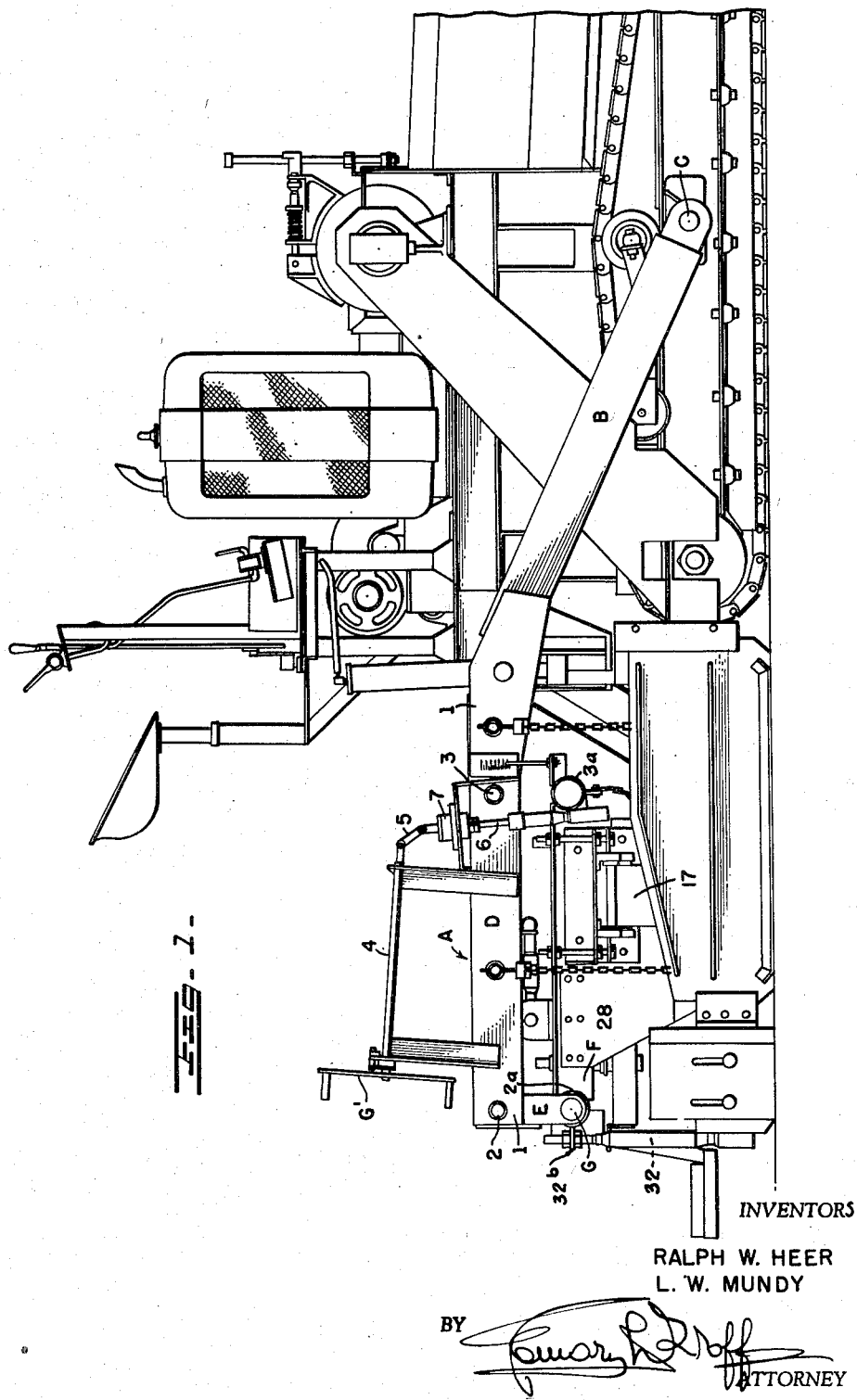
Fig. 1 is a partial view of a tractor showing the paving unit carried thereby in side elevation.

Referring to Fig. 1, it will be observed that the paver unit designated generally as A is towed by the tractor through the arms B, one at each side of the tractor, and pivoted at C.

The paving unit A includes a tow frame D of substantially rectangular formation and has side frame members 1 whose forward ends are connected to the arms B and the front and rear members 2 and 3, respectively.

The tow frame D has at each rear corner thereof depending brackets E for pivotally supporting a sub-frame F at the pivot points G. The sub-frame F is also of generally rectangular formation and includes the side members 1ª, front member 2ª, and the rear member 3ª, (Fig. 2). The said sub-frame has its front end moved upwardly and downwardly about the pivot G by the manually controlled adjusting and setting means (Figs. 1, 2, 3) including a handle portion G' connected with the shaft 4, which, in turn, has universal connections 5 with a vertical screw shaft 6 journalled in a bearing 7 and having its lower end 8 connected to the sub-frame F as indicated at 8 in Fig. 3.

The sub-frame F has, at its leading or front edge, a mold board H, later to be described more in detail, and which is located immediately behind conventional screw feeding or spreading mechanism X.

The mold board is disposed in advance of the oscillating strike-off screeds 10 each having a bottom angle member 11 inclined rearwardly and downwardly to preliminarily level off the road surfacing material prior to final compaction by the main vibrating screed which is in trailing relation thereto. These oscillating screeds are suspended below the sub-frame by a plurality of plate-type hangers 17 connected at 17' with an adjustable support as later described and with the oscillating strike-off screeds 10 at 17". Also, the hangers are disposed edgewise to the line of material flow and reciprocated by the links 18 (Figs. 8 and 9) connected with eccentrics 19 and driven by motor 20 through chain 21, Fig. 3.

The main vibratory compacting screed is made up of two transversely alined sections S and S', as shown in Figs. 4, 6 and 7, for example. Vibration for compaction purposes is imparted by shafts $S^2$ driven by a suitable motor M, shown in Fig. 6 having eccentric weights W thereon as shown in Fig. 6. Each section includes a bottom plate 22 having its front end provided with an upturned front angle 23 for gradually feeding and pre-compressing the bituminous material beneath the body of the screed, and is also internally compartmented as indicated at 24 to receive hot air through the conduit arrangement designated generally as 25 communicating with a suitable source of heat.

The inner adjacent ends 26 and 27 of the vibrating screed sections S and S', as shown in Fig. 4 for example, have the edges of the plate elements 22 in close abutting or mating relation as indicated at 31 and such relation is maintained whether the screed sections are alined horizontally or whether said inner ends are elevated in relation to the outer ends for crowning purposes.

Means is provided for supporting the outer ends of the vibratory screed sections S and S' such, for example, as plates 28 shown in Figures 1 and 3 and which are carried by the sub-frame F. Said plates are connected with a related bracket 29 by a pivot 30.

As will be seen from Figs. 2, 3, 6 and 7 for example, the rear edges of each screed section are supported by the outer adjustable screw elements 32, 32 and the inner adjustable screw elements 33. The outer screw elements 32 have their lower ends connected at 32ª (Figs. 6 and 7) with the outer ends of the screed section S and S'. The upper ends of the outer screw element 32 are connected by plates 32ᵇ with the sub-frame F (Figs. 2, 3 and 7). The inner screw elements 33 have their lower ends connected at 33ª to the inner end of a related screed section (Figs. 3 and 6) and have their upper ends connected with the adjustable crowning channel 41 (Fig. 3) by a common plate 33ᵇ (Fig. 2, 3 and 10).

In order to support the inner adjacent ends of the main vibrating screed sections for crowning adjustment, it will be seen from Figs. 3 and 4 that the inner ends 26 and 27 of said sections have secured thereto, the vertical inboard plates 35 and 36. These plates are supported at their upper ends by a cross pin 38 which also acts as a tilting axis along with the axis 30 to set the screed for mat depth control as previously indicated. This pin 38 in turn journalled in the bearing of depending offset arm 38ª of a horizontal sleeve 39 carried by the arms 40, 40 of a suspension bracket or yoke connected to the movable crowning channel 41. This crowning channel, as will be clear from Figs. 2 and 3, extends substantially throughout the short dimension of the sub-frame F and lies above the vibrating screed sections S—S' and also above the oscillating screeds 10 and to the rear of the mold board H.

It will also be observed from Figs. 3, 4 and 5, that the lower crowning support or channel 41 is supported for raising and lowering by turnable screw shaft members 42, 43 from an upper fixed support or channel 44 secured to and carried by the sub-frame F.

Bearing in mind that the essential supporting elements of the crowning mechanism are the movable channel 41 and the fixed channel 44 connected by the aforesaid screw shafts, and that the oscillating strike-off screeds 10 and their operating mechanism are carried by the lower movable channel 41 as will be apparent from Figs. 3 and 5, for example, further reference may also be made to Fig. 2 for the purpose of illustrating how the oscillating screeds are carried by and suspended from the lower channel 41.

Referring first to Fig. 5, it will be seen that the lower channel 41 is provided at each side thereof with the angle members 17$^a$ whose vertical legs are welded at 17$^b$ to the upright flanges of the channel. The horizontal legs of the angles 17$^a$ have secured thereto the horizontal legs of an angle member 17$^c$ whose vertical legs 17$^d$ slidably embrace the outer sides of the upper channel 44.

The horizontal legs of the angles 17$^a$ and 17$^c$ are connected by adjusting screws 17$^e$, whose upper ends appear in the plan view (Fig. 2). The lower ends of the screws 17$^e$ are anchored in the horizontal flanges of the angle members 17$^f$ whose vertical legs have a slidable bolt and slot connection 17$^g$ with the flanges of the channel 41. The undersides of the horizontal flanges of the angles 17$^f$ carry brackets for pivotally supporting the upper ends of the plates 17 as indicated at 17$^h$.

It will thus be seen that when the nuts on the screws 17$^e$ are loosened that the screws may be adjusted to raise or lower the related angles supporting the plates 17 as well as the motor 20, chain 21, and connections 18 and 19. These all move up or down with the adjustment of the hanger plates through the medium of the said adjusting screws.

The sub-frame F maintains a relatively fixed angular position relative to the main frame after once set, with the aid of the scale and pointer of Fig. 1, by the adjusting mechanism 4–8 inclusive, and, therefore, the channel 44 may be considered as the relatively fixed point from which the adjustable crowning channel 41 is suspended by the screw shafts 42 and 43.

Since the screw shafts 42—43 are mounted respectively in the lower channel 41 and the upper channel 44 in an identical fashion, a description of one screw and its associated parts will suffice for the other, and convenient reference may be made to Figs. 4 and 5.

The screw shafts whose lower ends pass through an opening in the web of the lower channel 41 are provided with nuts 45 set in a fixed adjusted position on the screw by a cotter key or the like to rotate therewith against the underside of the channel. The lower portion of the screw passes through a plain unthreaded thrust bearing 46 at the upper side of the channel 41 and the lower flange 46$^a$ is fast upon the said upper surface of the channel. Thus, the lower end of each screw shaft freely turns in its related bearing and the crowning channel 41 is fully supported by the nuts 45 to be responsive to the longitudinal movement of the screw shaft in the upper channel 44 as will now appear.

The upper face of the thrust bearing 46 is provided with a washer 47 which acts as a bearing for the hub portion of the sprocket 48 or its counterpart 49 (Fig. 3). The sprockets 48 and 49 are connected by a chain 50.

The screws 42, 43 have their upper ends mounted in the threaded bearings 51 which are bolted or otherwise secured to the web of the upper channel 44. As shown, the upper end of each screw shaft is provided with a wrench or tool engaging portion 52 to receive an appropriate operating member. Thus, when the tool is applied by the operator selectively to either the front or rear screw, such screw is turned by the wrench and the chain 50 will operate both screws.

When the chain is driven by turning either one of the screws and sprockets, the screws will move in the upper threaded bearings 51 and, depending on the direction of rotation, raise or lower the vertical plates 35 and 36 carrying the inner ends 26 and 27 of the screed sections relative to the outer ends which remain fixed in the position relative to surface to be paved and at the elevation selected by the positioning of the sub-frame through the adjusting means 4–8.

Referring now to the mold board H and the manner of mounting the same in relation to the oscillating screeds and also that it can be moved by the machine operator to dislodge accumulated residue, Figs. 3, 10, 11 and 12, show that the said mold board is connected by a hinge 55 at its upper end to a bracket 56 depending from the front member 2$^a$ of the sub-frame F.

Thus, it will be understood that the mold board is free to swing about the axis of the hinge 55. The medial portion of the mold board which receives the material spread by the conventional screws X is bowed while its lower end is provided with an angle member 57 whose rear edge 58 is held in spaced relation to the plain surface of the distributing member 10.

In order to maintain the edge 58 of the angle in relatively close spaced relation to the oscillating screed members 10, it will be observed from Figs. 10 and 12 that the rear portion of the mold board is provided with the socket members 59 pivotally connected at 60 to the members 61 on the rear face of the mold board.

These sockets receive one end of an adjustable rod 63 whose extremity is bottom in the socket while the opposite end has a nut element 64 welded thereto for receiving a screw 65 whose head 66 is provided with an eye 67 pivoted on pin 68 between brackets 69 carried by the frame member 3$^a$. A nut 70 on the shank of screw 65 is in abutting turnable relation to fixed nut 64 so that rod 63 may be lengthened or shortened relative to pin 68. This arrangement permits the mold board to be readily adjusted to keep the edge 58 out of abrasive contact with the oscillating screed members 10, although the mold board is releasably tensioned by means now to be described, and also permits said mold board to move away therefrom when the tensioning means are relaxed.

Referring to Fig. 11, it will be seen that the releasable tensioning means includes flexible elements 71 connected at one end with the rear member 3$^a$ of the sub-frame and at the other end with angle 61. More especially from Fig. 11 it will be seen that these flexible elements 71 comprise chain sections 72 whose intermediate ends are connected to a conventional adjustable cam type fastener 73. When the handle 74 is in the position shown in Fig. 11 the sections 72 tension the mold board so that it bears against the lower ends of the rods 63 and 58 is out of contact with 10. On the other hand, when the handle is pulled upwardly the chain sections are relaxed to let the mold board freely swing down on the hinge.

As will be clear from Fig. 10, the rods 63 and flexible tensioning elements 71 alternate with each other between the mold board H and the rear portion of the sub-frame 3$^a$.

When the apparatus is in operation the mold board H assumes the position shown in better detail in Figs. 11 and 12. However, when it is desired to clear road-mix from the mold board and the oscillating screeds 10, all the operator needs to do is to pull up on the handle 74 of the flexible locking means and the chain sections thereof will be released so that the mold board can move to a position far enough away from the oscillating screeds to permit a service man to scrape out congealed material with a hoe or the like. The braces or rods 63 have sufficient penetration in the sockets 59 to avoid them being disconnected when the mold board moves through the maximum arc permissible by the released flexible elements 72. The operator may restore the handle 74 to the position of Fig. 11 and the machine is ready for further use.

We claim:

1. A paver for laying bituminous mats, comprising, in combination, a tow frame disposed in a substantially horizontal position, a sub-frame pivoted about a transverse axis on the tow frame and having its front portion adjustable relative to said tow frame, screed sections having abutting inner edges and the inner and outer ends suspended from said sub-frame, crown adjusting means for controlling the raising and lowering of the abutting inner edges of the screed sections, said crown adjusting means including an upper channel fixed to the tow frame and an adjustable lower channel disposed beneath said upper channel each having web portions and disposed in substantially horizontal planes longitudinally of the paver, means depending from the lower channel and connected with the inner ends of the screed sections to hold them in selected angular relation, a pair of spaced vertical screw shafts rotatably connected at their bottom ends to the web of said lower channel, and nut means for each shaft secured to the web of said upper channel and threadedly receiving said screw shafts, and means connecting said screw shafts and responsive to selective turning of one of them to actuate both shafts to raise and lower the adjustable channel.

2. A paver for laying bituminous mats, comprising, in combination, a tow frame disposed in a substantially horizontal position, a sub-frame pivoted about a transverse axis on the main frame and having its front portion adjustable relative to said tow frame, horizontally aligned vibratory screed sections having abutting inner ends, means supporting the outer ends of said screed sections and crowning adjusting means for raising and lowering the inner abutting ends of the vibratory screeds relative to their outer ends for changing the longitudinal angular relation of the screed sections to effect crowning, said crown adjusting means including an upper elongated support fixed to the sub-frame, an elongated lower vertically adjustable support disposed in registering relation to said fixed upper support, screw-threaded shafts for vertically adjusting the lower support relative to the upper support, said screw shafts being vertically disposed relative to both supports and having their lower ends rotatably connected to the lower adjustable support and nut means for receiving each shaft and fixed against vertical movement on the upper support, and means connecting the lower vertically adjustable support with the inner ends of the screed sections to hold them against vertical deflection.

3. A paver for laying bituminous mats, comprising, in combination, a tow frame disposed in a substantially horizontal position, a sub-frame pivoted about a transverse axis on the tow frame and having its front portion adjustable relative to said tow frame, oscillating strike-off screed sections carried by the front portion of said sub-frame, horizontally aligned vibratory screed sections disposed rearwardly of said oscillating screed sections, said screed sections supported at their front by pivots having their axis substantially parallel to the longitudinal axis of said screed sections, support means disposed intermediate said pivots and said sub-frame, outer and inner pairs of adjusting elements having their lower ends supporting the rear edge portions of said vibratory compacting screed sections from the sub-frame, and crowning adjusting means for raising and lowering the inner ends of said oscillatory screed sections and the vibratory screed sections, said crowning adjusting means including an upper support fixed to the sub-frame, a lower vertically adjustable support disposed longitudinally of the sub-frame and below said fixed support, adjusting means depending from said lower adjustable support and connected with the inner meeting edges of the vibratory screed sections, screw threaded shafts connecting the fixed upper and lower adjustable supports for vertically adjusting said lower support relative to the fixed upper support, said screw shafts vertically disposed relative to both supports and having their lower ends rotatably connected to the said lower adjustable support, nut means for each shaft fixed against vertical movement on the upper support, sprockets carried by each shaft, and a chain connecting said sprockets, whereby, when one of said shafts is turned the other will be turned in equal degree to change the relatively transverse angular relation of the inner ends of said vibratory screeds to regulate the crown of the mat.

References Cited in the file of this patent

UNITED STATES PATENTS

| | | |
|---|---|---|
| 1,591,593 | Weller et al. | July 6, 1926 |
| 2,012,784 | Barber | Aug. 27, 1935 |
| 2,180,198 | Day | Nov. 14, 1939 |
| 2,351,592 | Barber | June 20, 1944 |
| 2,351,593 | Barber | June 20, 1944 |
| 2,473,961 | Mandt | June 21, 1949 |
| 2,847,917 | Heer et al. | Aug. 19, 1958 |
| 2,890,632 | Madison et al. | June 16, 1959 |

UNITED STATES PATENT OFFICE
CERTIFICATE OF CORRECTION

Patent No. 2,947,230                          August 2, 1960

Ralph W. Heer et al.

It is hereby certified that error appears in the above numbered patent requiring correction and that the said Letters Patent should read as corrected below.

Column 1, line 52, after "screeds." insert the following paragraphs:

Fig. 10 is a rear elevation.

Fig. 11 is an enlarged detail view partly in section and partly in elevation, further illustrating the internal structure of the vibratory screeds and the means vibrating them.

Signed and sealed this 3rd day of July 1962.

(SEAL)
Attest:
ERNEST W. SWIDER
Attesting Officer

DAVID L. LADD
Commissioner of Patents